United States Patent [19]
Cortigene et al.

[11] 4,203,388
[45] May 20, 1980

[54] ANIMAL LITTER AND PROCESS

[75] Inventors: Louis R. Cortigene; Robert G. Wright, both of Portage, Mich.

[73] Assignee: Brown Company, Kalamazoo, Mich.

[21] Appl. No.: 672,471

[22] Filed: Mar. 31, 1976

[51] Int. Cl.² .............................................. A01K 29/00
[52] U.S. Cl. ........................................................ 119/1
[58] Field of Search ............................................... 119/1

[56] References Cited

U.S. PATENT DOCUMENTS

| | | | |
|---|---|---|---|
| 2,708,418 | 5/1955 | Sugarman et al. | 119/1 |
| 2,715,067 | 8/1955 | Kamlet | 119/1 X |
| 3,735,734 | 5/1973 | Pierce et al. | 119/1 |
| 3,828,731 | 8/1974 | White | 119/1 |
| 3,941,090 | 3/1976 | Fry | 119/1 |
| 3,980,050 | 9/1976 | Neubauer | 119/1 |

*Primary Examiner*—Jay N. Eskovitz
*Attorney, Agent, or Firm*—Gordon W. Hueschen

[57] ABSTRACT

An animal litter is prepared by de-watering rejects of a secondary fiber plant, incorporating a deodorant therein, for example, sodium bicarbonate, pelletizing, and drying. The rejects on a dry basis consist essentially of about 50 percent to about 90 percent cellulose and from about 10 percent to about 50 percent fiber making mineral filler, usually kaolin, and sodium bicarbonate is incorporated therein in the amount of between about 1 percent to about 10 percent on the dry basis. Paper broke may also be incorporated.

4 Claims, No Drawings

ANIMAL LITTER AND PROCESS

1. BACKGROUND OF THE INVENTION

This invention relates to an animal litter and a process for making the same and utilizes for this purpose a waste product from a secondary fiber plant, which waste product is ordinarily carted to a landfill or otherwise disposed of.

2. PRIOR ART

In secondary fiber plants, recycled paper from offices and elsewhere is re-pulped and re-cleaned. In the cleaning process the rejects, which may be from screen cleaning and/or from flotation type screening or both, are pooled, transferred to a sedimentation tank to effect concentration of the solids and the concentrated solids are pumped off from the bottom of the sedimentaion tank onto a vacuum filter. The resulting mat contains about 20 to about 30 percent solids consisting essentially between about 50 to about 90 percent cellulose and between about 10 to about 50 percent paper-making mineral filler depending upon the type of paper which is recycled. If a large percentage of slick magazine or other highly filled paper is in the recycle, the proportion of mineral filler will be high. Thus, the precise composition of the mat will vary somewhat according to the source of the recycled paper. Heretofore, this mat has been carted off to a landfill or otherwise disposed of.

Heretofore, animal litter has been made of some absorbent material containing a suitable deodorant material. Bactericides are also sometimes included. As illustrated of such prior art, may be cited the following U.S. Pat. Nos.: 2,708,418; 3,059,615; 3,425,397; 3,636,927, 3,735,734; 3,747,564; 3,765,371; 3,789,797; and 3,816,577.

OBJECT OF THE INVENTION

It is an object of the invention to provide a new and improved animal litter. It is an object of the invention to provide a process for making a new and improved animal litter. It is an object of the invention to provide a use for discarded waste product. It is a further object of the invention to provide an animal litter which, notwithstanding that it is made from a heretofore discarded waste material, is competitive with the best animal litters available. It is a further object of the invention to avoid the disadvantages of the prior art and to obtain such advantages as will appear as the description proceeds.

BRIEF DESCRIPTION OF THE INVENTION

An animal litter comprising pelleted and dried rejects of a secondary fiber plant containing a deodorizer material is prepared by de-watering rejects of a secondary fiber plant, cutting the rejects into small pieces, incorporating therewith a deodorant material, pelletizing and drying.

The deodorant material, advantageously, is sodium bicarbonate which, advantageously, is present in an amount of between about 1 percent to about 10 percent, preferably 5 percent, based on the dry weight of the litter. The sodium bicarbonate may be partially or totally replaced by other suitable deodorants, for example, chlorophyll, sodium dihydrogen phosphate, potassium dihydrogen phosphate, potassium acid phthalate, the water soluble constituents of cherry pits, 2-isopropoxycamphane, 2($\beta$-hydroxyethyoxy)camphane, and the like. Additionally, there may be included bactericides such as cetylperidium chloride, cetalkonium chloride, and the like, which function both as a bactericide and as a surfactant. Other such dual-acting bactericides are disclosed in U.S. Pat. No. 3,765,371. There may also be included antioxidants as in that patent and there may also be included mold inhibitors such as propionic acid and its salts, and phenols and phenolic salts such as sodium pentachlorophenol. Pigments and dyes may also be included, most advantageously, in the slurry fed to the vacuum filter. For example, along with the flocculating agent added to improve the filtration.

The basic animal litter composition of the invention is prepared from rejects of a secondary fibre plant. The solids in these rejects consist essentially of about 50 percent to about 90 percent cellulose and from about 10 percent to about 50 percent paper-making mineral filler which is chiefly kaolin or china clay. These rejects are de-watered, cut into pieces, mixed with the deodorant or other additives, pelletized and dried. To give a pelleted and dried material containing, in addition to the solids of the rejects which consist of about 50 percent to about 90 percent cellulose and about 10 percent to about 50 percent mineral filler, about 1 percent to about 10 percent deodorizing material on a dry weight basis.

In a secondary fiber plant, the raw material is recycled paper such as is collected from office buildings and the like. This recycled paper ranges from highly filled paper such as the slicks used in the slick magazines to partially filled papers such as office stationery to completely unfilled paper such as newsprint. In order to obtain fibers from such heterogenous product, the waste paper must be re-pulped and cleaned to separate from the fibers the mineral fillers and dyes and pigments associated therewith. For this purpose, the re-pulped waste paper is subjected to a series of cleaning operations which comprises screening, flotation and the like and the off-colored fractions and the fractions containing the mineral fillers are what constitute the rejects. These rejects are pooled and concentrated in a sedimentation tank and partially de-watered on a vacuum filter. The resulting mat contains about 20 percent to 30 percent solids consisting essentially of about 50 percent to 90 percent cellulose and about 10 percent to 50 percent mineral filler. Sometimes there may be a very small amount of polyethylene or like plastic as a result of some coated papers being in the scrap but the amount is so small as to be insignificant.

This mat is then further de-watered in a suitable press, centrifuge, or the like, to bring the water content down to between about 32 percent to about 40 percent. Thirty-two percent water is about as low as can be obtained in a screw press. More water could be removed in a centrifuge but in accordance with this invention it is neither necessary nor desirable at this stage to remove more of the water.

If desired, the cut vacuum filter mat can be admixed with dried paper broke which has been reduced in size by a shredder or a hammer mill such as produced by Sprout Waldron, Bryant-Poff, and others. Up to about 50 percent advantageously, at least about 10 percent, of the cut mat solids can be replaced in this manner. Paper broke conprises the paper scrap which comes off of paper machines and converting operations. The paper broke most advantageous for use in the litter of the invention is the non-repulpable broke, e.g., that from parchment, wet strength-treated paper, or resin-treated paper.

A screw press is of particular advantage when dry paper broke is incorporated with the cut mat. The screw press acts, first, thoroughly to mix the two components and then as the squeeze or press becomes greater, to equilibrate the moisture in the mass so that the broke becomes wet and the moisture in the press cake is uniformly distributed.

The de-watered cake is cut into small pieces. If a screw press is used, the press operation itself will extrude the pressed cake into a suitable rod or rods which can be cut or chopped into small pieces by a whirling blade. Sodium bicarbonate or like deodorant is then incorporated into the cut pieces and thoroughly mixed therewith and the mixture is pelleted into suitable size pellets, dried and sterilized. Advantageously, the pellets are about ⅛ inch in diameter and about ⅜ inch long. The particular size, however, is not critical and the pellets may range from about 1/16 inch diameter to about ⅜ inch diameter and from about 3/16 inch length to about 1 inch length.

The pellets should be dried, to a value, say of about 5 to about 15 percent moisture, which on the low side does not tend to cause glazing of the pellets with a consequent lowering of absorptivity and on the high side does not deleteriously reduce the amount of water that can be taken up. Also, too much moisture may result in mold formation. The drying, advantageously, is effected at a temperature which gives a sterile product.

Suitable screw presses for the above operation are the Anderson Press made by Anderson-Ibec Company and the Bauer Press made by the Bauer Division of C. E. Raymond Company. Sutable pelleting machines include the California Pellet Mill, the Sprout Waldron Pellet Mill and the Dravo Pellet Mill. Suitable driers, which also act as sterilizers, are Rotary Driers or Fluid Bed driers manufactured by C. E. Raymond or Jeffrey Manufacturing Company.

The mineral filler will ordinarily consist essentially of kaolin or china clay but in some cases will contain titanium dioxide, calcium carbonate, and the like.

DETAILED DESCRIPTION OF THE INVENTION

Example 1

The wet mat of secondary fiber waste from the vacuum filter in a secondary fiber plant was charged into an Anderson Screw Press and therein de-watered to about 33 percent water. As the pressed cake was extruded from the press it was chopped into small pieces by a whirling blade. These pieces were mixed thoroughly with sodium bicarbonate in the proportion of 5 percent sodium bicarbonate on a dry weight basis and pelletized in a California Pellet Mill into pellets of ⅛ inch diameter and ⅜ inch long and then dried to a moisture content of 10 percent in a Jeffrey Fluid Bed drier. The resulting product contained 65 percent cellulose, 35 percent mineral filler, and 5 percent sodium bicarbonate on a dry weight basis and was found to be an excellent kitty litter in its ability to absorb moisture and odors.

Example 2

The process of Example 1 was repeated using 50 percent wet mat of secondary fiber plant and 50 percent parchment broke on a dry weight basis. The resulting product contained about 80 percent cellulose, 15 percent mineral filler, and 5 percent sodium bicarbonate on a dry weight basis.

It is to be understood that the invention is not to be limited to the exact details of operation or structure shown and described as obvious modifications and equivalents will be apparent to one skilled in the art.

I claim:

1. Animal litter comprising pelleted and dried cellulose-containing rejects of a paper-making fiber plant and a deodorizer material, said rejects comprising at least about 50 percent of the waste rejects of a secondary paper-making fiber plant consisting essentially of cellulose and mineral filler, and in which said rejects comprise a mixture of said waste rejects and paper broke.

2. The animal litter of claim 1, in which said paper broke is non-repulpable paper scrap.

3. The animal litter of claim 2, in which said waste rejects consist essentially of about 50 to about 90 percent cellulose and about 10 to about 50 percent mineral filler and said paper broke is essentially cellulose.

4. The animal litter of claim 3, in which said rejects comprise on a dry weight basis about 10 to about 50 percent of said paper broke and the balance essentially said waste rejects.

* * * * *

UNITED STATES PATENT AND TRADEMARK OFFICE
CERTIFICATE OF CORRECTION

PATENT NO. : 4,203,388
DATED : May 20, 1980
INVENTOR(S) : Louis R. Cortigene and Robert G. Wright It is certified that error appears in the above—identified patent and that said Letters Patent is hereby corrected as shown below:

[56] References Cited, U.S. PATENT DOCUMENTS, line 3; "Pierce et al." should read -- Pierce, III et al. -- Attachment to paper 4, Notice of References Cited, U.S. PATENT DOCUMENTS, line D.
[57] ABSTRACT, last line; "may also be" should read -- also may be --
Col. 1, line 17; "sedimentaion" should read -- sedimentation --
Col. 1, lines 32 & 33; "illustrated" should read -- illustrative --
Col. 1, line 68; "2(β-hydroxyethyoxy)" should read -- 2(β-hydroxyethoxy) --
Col. 2, line 14; "fibre" should read -- fiber --
Col. 2, line 63; "conprises" should read -- comprises --
Col. 3, line 41; "Sutable" should read -- Suitable --

Signed and Sealed this

First Day of December 1981

[SEAL]

Attest:

GERALD J. MOSSINGHOFF

Attesting Officer

Commissioner of Patents and Trademarks